Feb. 16, 1971 W. J. CUMBER 3,562,873

CHANNEL CLIPS

Filed Oct. 11, 1968

INVENTOR.
WILLIAM J. CUMBER
BY *Adrian Medert*
ATTORNEY

United States Patent Office 3,562,873
Patented Feb. 16, 1971

3,562,873
CHANNEL CLIPS
William J. Cumber, Chardon, Ohio, assignor to Erico
Products, Inc., Cleveland, Ohio, a corporation of Ohio
Filed Oct. 11, 1968, Ser. No. 766,871
Int. Cl. A44b 21/00
U.S. Cl. 24—81                                    2 Claims

ABSTRACT OF THE DISCLOSURE

The invention relates to a clamp for securing a channel shaped member to a depending supporting rod or the like, made of a strip of spring steel having a body portion including two angularly disposed straight members formed with aligned side opening notches, with detents formed therein, adapted to receive the rod therethrough. The said straight portions are moved toward each other and then laterally to engage the rod within the notches. Release of the straight portions effects a gripping of the rod by the detents in the notches due to the inherent spring tension of the body portion. Arms integrally formed on the said straight portions, one of which has a reversely bent end, and the other detent means receive and resiliently hold therebetween the longitudinal edge portions of an elongated channel shaped member.

---

Figure 1:
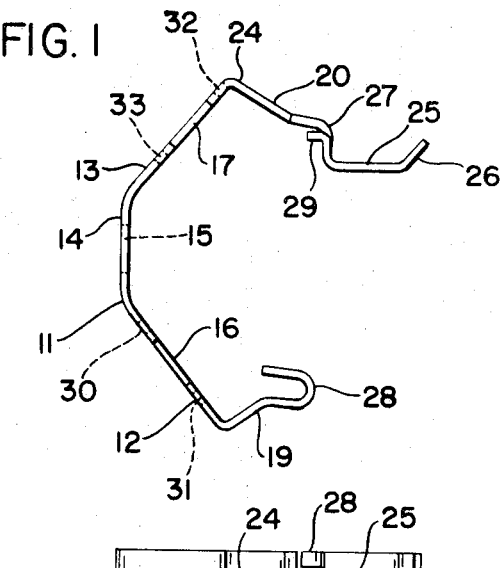

This invention relates to a clamp for receiving a channel shaped member and more particularly to a supporting device formed of resilient sheet metal suitable for securing a lather's channel or the like, to depending rods or wires.

Clamps for the purpose of supporting channel members from depending rods, wires and the like, have been available for some time and have been extensively used. In this connection, reference is made to the structure disclosed in the Leslie W. Havener Pat. No. 3,233,297. Although the clamp of the patent has met with wide acceptance and success in the building construction industry, it has encountered certain limitations in its applications. For example, where the supporting rod or wire has been previously installed in a building unit or is a permanent part of a construction unit and the end of the supporting rod is not free, the clamp of the patent cannot be used. In remodeling where the supporting rod is in use to support a fixture or other construction elements, dismantling is required before the prior art clamps can be applied to the supporting rod.

Accordingly, it is among the objects of the present invention to provide a simple and efficient clamping device for securing a channel shaped member to a depending rod or wire which overcomes the drawbacks of prior art devices and which may be readily assembled or mounted on a rod intermediate its ends and when so assembled or mounted, presents a relatively rigid and integrated structure.

Another object of the invention is to provide a clamping device which may be readily assembled with or on a length of rod or wire and when so positioned, readily receives a channel shaped structural member, resiliently holding the same against axial displacement with respect to the rod.

A still further object of the invention is to provide a clamp for supporting channel shaped members from a rod or wire which is moved laterally with respect to the rod in mounting the same thereon.

Another object of the invention is to provide a channel receiving clamp which is of inexpensive construction and capable of manufacture in a series of simple and rapid operations and which may be manually assembled on a depending rod or wire with a high degree of precision and a minimum of time and effort.

Figure 2:
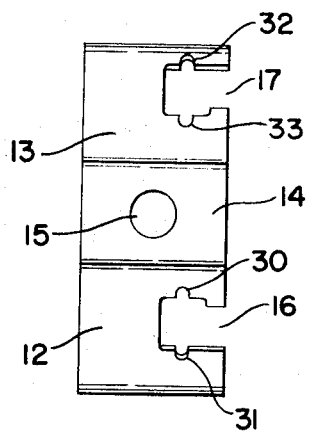
Figure 3:
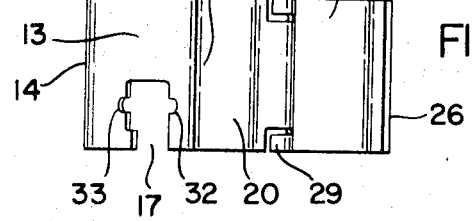
Figure 4:
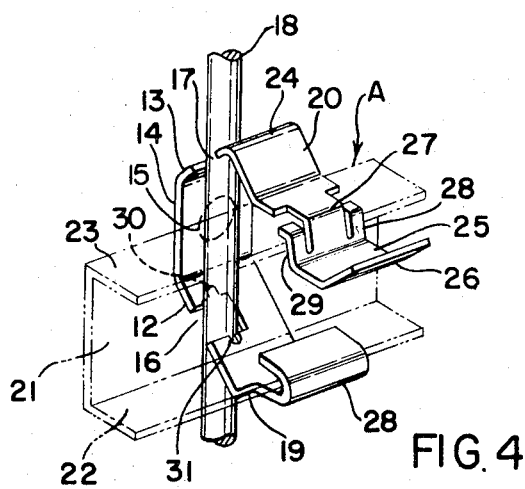
Figure 5:
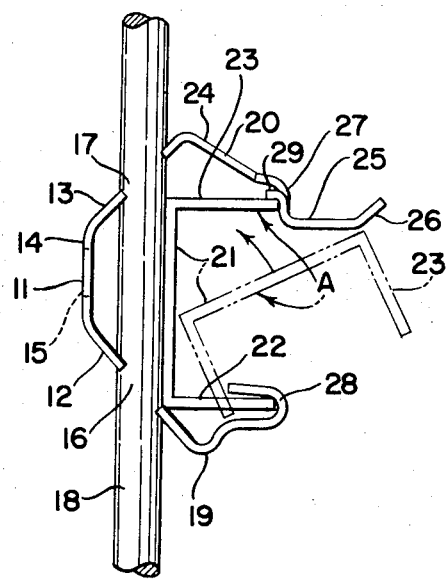
Figure 6:
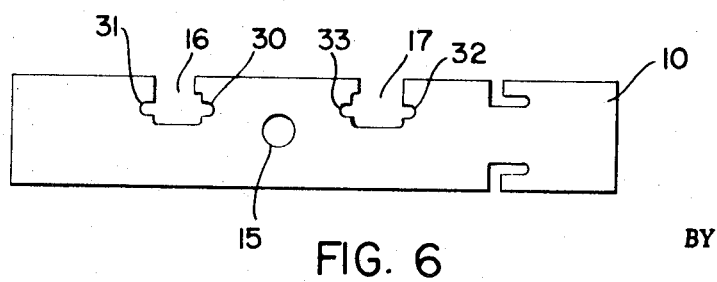

Other objects and advantageous features of this invention will become more apparent from the following detailed description of a presently preferred embodiment thereof illustrated in the accompanying drawings wherein corresponding reference characters denote corresponding parts and wherein:

FIG. 1 is a side elevational view of a clamp embodying the present invention,

FIG. 2 is a rear or outside view of the clamp as viewed from the left in FIG. 1, FIG. 3 is a top plan view of the clamp of FIG. 1, FIG. 4 is an isometric view illustrating the manner of mounting the clamp upon a vertical supporting rod or wire and showing a channel shaped structural member in phantom supported by the clamp, FIG. 5 is a side elevational view showing the clamp mounted on the rod and illustrating the steps in securing a channel within the clamp, and FIG. 6 is a top plan view of a strip of metal from which the clamp may be formed.

Referring now to the drawing, there is illustrated (FIG. 1) a clamp for supporting a channel shaped member, such as a lather's channel, from a rod, wire or the like, made in accordance with the teachings of the present invention and comprising a flat strip 10 of strong, resilient material, preferably spring steel, which has been formed to provide a body portion 11 including two straight rod engaging portions 12 and 13 extending with respect to each other at an angle slightly greater than normal and connected at their adjacent ends by a short intervening wall portion 14. The wall portion 14 is apertured as at 15 to serve as a means to index the clamp as it is formed in a series of successive operations in successive dies. The rod engaging portions 12 and 13 are provided with aligned notches 16 and 17, respectively, extending laterally inwardly from one longitudinal edge thereof to receive a vertical supporting rod or wire 18 therein in a manner explained more in detail hereinbelow.

Extending outwardly from the remote ends of the rod engaging portions 12 and 13, are arms 19 and 20, respectively, which serve to receive therebetween and support, a suitable channel shaped member A which includes a web 21, an upper leg 22, and a lower leg 23. The arm 20 which extends from the end of the rod engaging portion 13 in a plane generally normal to the plane of the portion 13, includes a wall portion 24, a second wall portion 25, offset with respect to the portion 24 and terminating in an upturned lip 26, and an intervening connecting wall portion 27 therebetween. The connecting wall 27 is provided with a pair of detents 28 and 29 formed in the opposite side edges thereof and extending in a plane substantially parallel to the plane of the wall portion 25.

Similarly, the arm 19 formed on the outer end of the rod engaging portion 12, is disposed in a plane substantially normal thereto and has its outer free end reversely bent inwardly to form a hook 28 which receives therein the longitudinal edge of the leg 22 of the channel member 18. To compensate for variances in the leg width of a channel member the arm 19 is bent slightly upwardly to increase the spring tension of the clip upon the legs of the channel member.

Referring now more specifically to FIGS. 4 and 5 of the drawing, the manner of assembling the clip of the present invention on a suitable supporting rod 18 for supporting the channel member A, will now be described. Each of the lateral notches 16 and 17 is elongated toward the intervening wall portion 14 being of generally rectangular configuration with short, narrow central extensions 30, 31, 32 and 33 respectively, such extensions consequently producing corresponding inwardly projecting corners or detents operative to engage and bite into the supporting rod 18 when the clamp is positioned on the rod as shown in FIGS. 4 and 5. As illustrated in FIG. 5, arms 19 and 20 of the clamp may be manually squeezed toward one another to move the rod engaging portions 12 and 13 toward a parallel position thereby enlarging the aligned effective rod receiving area of the notches 16 and 17 so that the clamp can be laterally moved on to the rod and then shifted to the desired position it is to assume. Upon releasing the squeezing pressure, however, the rod engaging portions 12 and 13 tend to move toward their initial unstressed position, but before reaching such position, the inner detents or corners afforded by extensions 30, 31, 32 and 33 of the notches 16 and 17 bite into and grip the respective sides of the rods.

The channel shaped member A may now readily be inserted into the clamp as shown in FIGS. 4 and 5. The outer edge portion of the leg 22, is inserted within the area defined by the hook 28, and the channel is rotated in a counter clockwise direction as shown in FIG. 5 to bring the web portion 21 thereof to bear against the rod 18. In so doing, the arms 19 and 20 are bent outwardly about their juncture with the straight rod engaging portions 12 and 13. As shown in FIG. 5, the edge portion of the leg 23 is locked within the shoulder formed by the detents 28 and 29 and the portion 25 of the arm 20. Should the width of the leg 23 be less than the distance from the rod to the offset wall 25, the detents 28 and 29 will lock below the edge of the leg 23. Thus, the channel is securely locked between the hook 28 and the detents 28 and 29. The clamp is so shaped that being of resilient material, it can accommodate a considerable variation in the extent of the channel leg portions and if the channel should be exceptionally shallow, the upper lip thereof may actually engage behind the prongs or detents 28 and 29 as above referred to. The spreading action of the channel upon the retaining clamp serves to enhance the biting action of the detents of the notches 16 and 17 upon the supporting rod 18 and prevents any slipping or sliding with respect thereto. Similarly, the channel is itself resiliently actively clamped between the upper arm 20 and lower arm 19 of the clamp as well as being mechanically secured in position against the surface of the rod 18 by the detents of arm 20 and the hook formed on arm 19, each of which engage respective edges of the upper and lower legs of the channel member under compressive force.

The provision of flat wall portion 14 between the angularly disposed straight rod engaging portions 12 and 13, is not essential but in the larger sizes of the clamp made in accordance with this invention, contributes to a more compact, less bulky type of clamp in that the body portion thereof is confined relatively close to the supporting rod with which it is associated. The extensions 30, 31, 32 and 33 in notches 16 and 17, afford more detents in each such opening to grip rod 18. This arrangement has resulted in improved gripping strength over clamps which have been used heretofore. The configuration of the arms 19 and 20 being slightly curved inwardly as they extend from the joint with the straight rod engaging portions 12 and 13, afford added resilience when the arms of the clamp are spread apart to receive the channel which is rotated into place.

Having thus described my invention so that those skilled in the art may practice the same, what I desire to obtain by Letters Patent is defined in the appended claims.

I claim:

1. A resilient sheet metal clamp for securing a channel shaped member to a rod or like elongated supporting member comprising a body portion having two rod engaging portions angularly disposed with respect to each other, means on each of said rod engaging portions for resiliently receiving and supporting therebetween the channel shaped member, said rod engaging portions having aligned notches extending laterally inwardly from one side edge thereof, detent means formed in the end wall surface of the notches adapted to resiliently grip the elongated rod when disposed within said notches, said means on the first of said rod engaging portions including a reversely bent end portion adapted to engage the edge surface of one leg of the channel member, said means on the other of said rod engaging portions including two wall portions offset with respect to each other and an intervening wall portion therebetween and inwardly projecting means formed in said intervening wall portion adapted to engage the edge surface of the other leg of the channel member.

2. The clamp of claim 1 wherein the channel engaging means on the rod engaging members extend substantially normal thereto.

References Cited

UNITED STATES PATENTS

| 527,959 | 10/1894 | Flesher | 24—259RCX |
| 587,365 | 8/1897 | Forde | 24—259RCX |
| 3,233,297 | 2/1966 | Havener | 24—81B |

FOREIGN PATENTS

| 435,647 | 10/1967 | Switzerland | 24—81CR |

DONALD A. GRIFFIN, Primary Examiner